Aug. 19, 1958     E. G. STEVENS     2,848,238
STALK AND STRAW DISINTEGRATING AND DISTRIBUTING MECHANISM
Filed Feb. 8, 1956
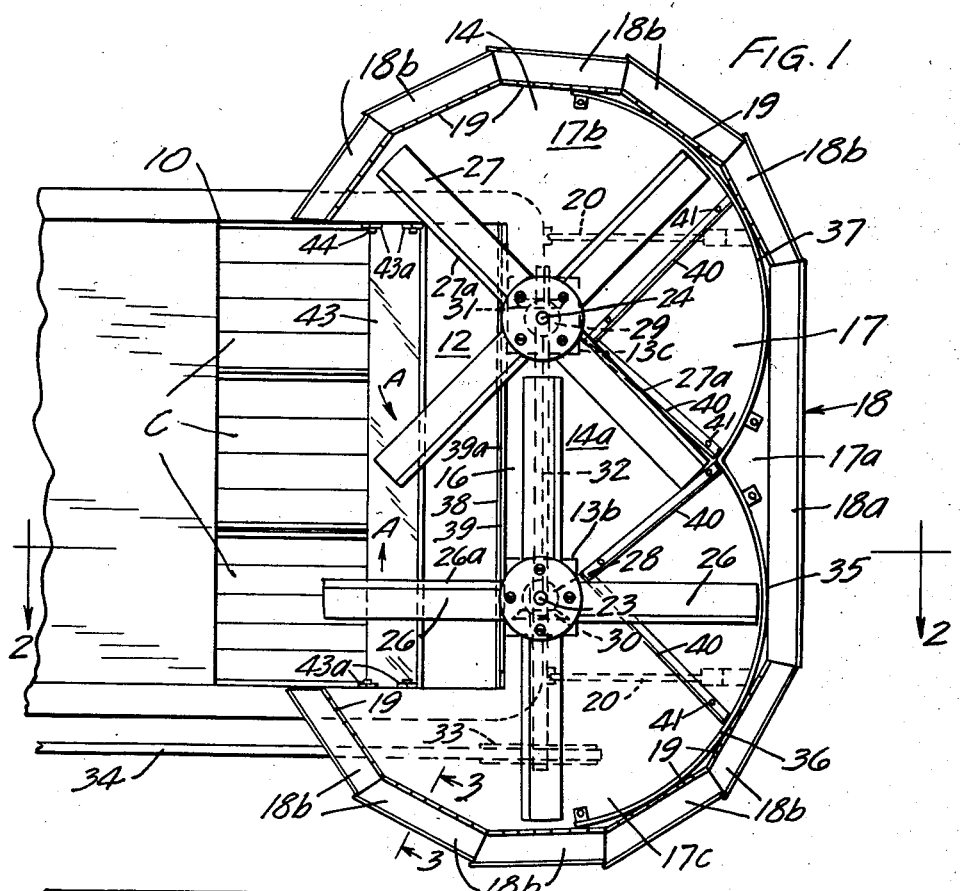
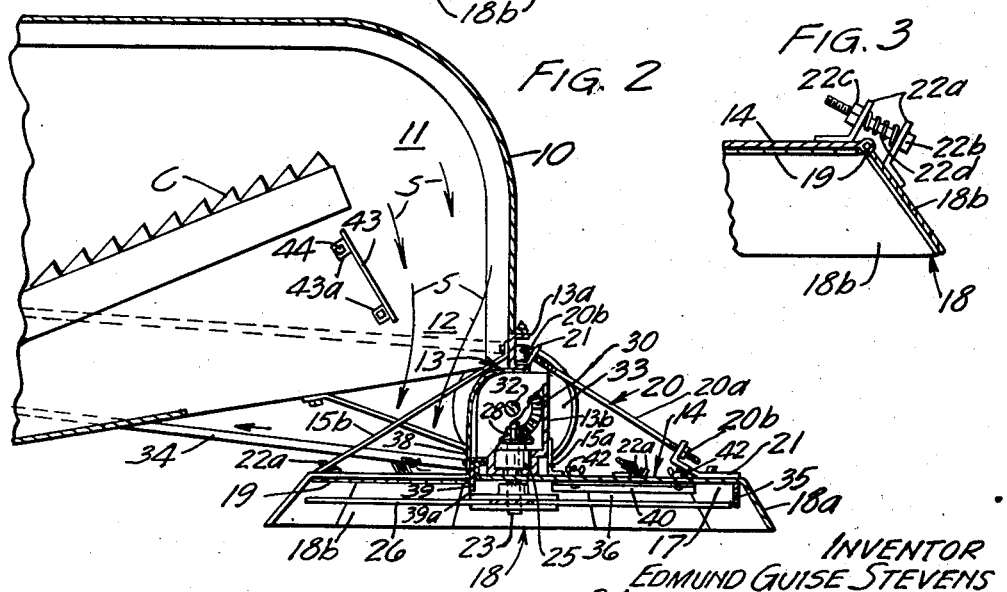
INVENTOR
EDMUND GUISE STEVENS
BY
Williamson, Schroeder, Adams & Meyers
ATTORNEYS

# United States Patent Office 2,848,238
Patented Aug. 19, 1958

2,848,238

STALK AND STRAW DISINTEGRATING AND DISTRIBUTING MECHANISM

Edmund Guise Stevens, Charleswood, Manitoba, Canada

Application February 8, 1956, Serial No. 564,312

10 Claims. (Cl. 275—3)

This invention relates to harvesting equipment such as combines and more specifically relates to mechanism for fragmentizing and scattering in a controlled manner, straw and stalks discharging from such equipment.

Although there have been several types of straw and stalk cutting and scattering mechanisms developed in recent years, it has been my experience that many of these various types of mechanisms have had some distinct disadvantages. One of the most important of these disadvantages is that such mechanisms fail to properly scatter and distribute the disintegrated material over the ground behind the harvesting equipment. Some mechanisms merely drop the disintegrated material in a more or less regular row behind the harvester, other mechanisms permit the disintegrated material to be scattered in substantially all directions including upwardly so as to create unpleasant working conditions in proximity with the harvester. It has been found that if the straw particles from a combine can be evenly distributed and scattered, instead of being piled in swaths, the fineness to which the straw particles are chopped becomes less important. It is believed that straw and stalks, if cut only into small fragments or pieces rather than being comminuted or pulverized provide more effective soil conditioning and fertilizing. Another distinct disadvantage of some mechanisms is that the stalks and straw, being discharged from the combine or other such equipment, are permitted to be deposited on the ground before they are thoroughly fragmentized and as a result such material does not properly decay and fertilize the soil and in addition, makes the soil hard to work up for subsequent use.

Therefore, with these comments in mind, my invention is directed to the substantial elimination of these and other disadvantages and to the inclusion of other novel improvements.

An object of my invention is to provide a new stalk and straw chopper and spreader of relatively simple and inexpensive construction and operation which may be used as an accessory or as original equipment with harvesting machinery such as combines and the like.

Another object of my invention is to provide novel apparatus for attachment to harvesting machinery which will cut and disintegrate stalks and straws discharged from such machinery and will thereafter efficiently spread the fragmentized material in a controlled manner over a large area of ground to both the rear and sides of the machinery as it travels over the ground.

Still another object of my invention is to provide apparatus for attachment to harvesting machinery and the like which will receive stalks and straw being discharged from such machinery and will hold such material until substantially all of the stalks and straw are cut and fragmentized to the necessary size for conditioning the soil and which apparatus will thereafter spread such material evenly over the ground surface while keeping the amount of dust created to a minimum.

A further object of my invention is the provision of apparatus attachable to harvesting equipment and the like for fragmentizing and spreading stalk and straw material discharged from the equipment and which mechanism is adjustable for controlling the spreading and distributing of the material onto the ground wherein the proportions of the material spread to the rear and to the sides of the equipment may be varied.

These and other objects and advantages of my invention will more fully appear from the following description made in connection with the accompanying drawings wherein like reference characters refer to the same or similar parts throughout the several views and in which:

Fig. 1 is a bottom plan view of the invention;
Fig. 2 is a section view taken on a vertical plane substantially at 2—2 of Fig. 1; and
Fig. 3 is a detail section view taken on a substantially vertical plane as indicated at 3—3 of Fig. 1.

My invention is shown attached to the multi-wall housing 10 of a combine, which housing defines a generally descending straw discharge passage 11 having a generally rectangular opening 12 at the end thereof and at the lower portion of housing 10. The harvester has a conventional type straw conveyor C for carrying the straw to the discharge passage 11 and opening 12.

Suitable supporting or mounting structure 13 is attached to the rear wall of housing 10 below the lower edge thereof and adjacent the generally rectangular opening 12 of the housing. The mounting structure 13 includes a channel 13a which is affixed to the lower edge of housing 10 as by bolts, and also includes the rigid gear boxes 13b and 13c which are affixed to the channels 13a as by welding and are disposed in widely spaced relation with each other adjacent opposite sides of the discharge opening 12 of housing 10. A hood indicated in general by numeral 14 is secured to the mounting structure by brackets 15a and support rods 15b of the housing 10 adjacent the opening 12. Hood 14 comprises an enlarged panel which has an inner and forward edge portion 16 disposed in close proximity with the opening 12 of housing 10 and also has an outer peripheral portion 17 disposed outwardly from opening 12. The outer peripheral portion 17 includes an intermediate section 17a which is disposed rearwardly from opening 12 and also includes side sections 17b and 17c which are respectively disposed laterally outwardly in opposite directions from the terminal portion of housing 10. Hood 14 extends in a substantially horizontal plane and defines an enlarged and downwardly facing surface 14a.

Hood 14 is also provided with a straw-deflecting skirt or flange indicated in general by numeral 18 which is secured to and depends from the outer peripheral portion 17 of hood 14. The central and rearward portion 18a of skirt 18 is, in the form shown, formed integrally of hood 14 and is sloped outwardly and downwardly therefrom. The portions of skirt 18 adjacent the side portions 17b and 17c of the hood outer periphery 17 are constructed to be adjustable in slope so that they may be inclined to various angles with respect to the plane of hood 14 and with respect to the normal. In the form shown, a plurality of skirt sections 18b, which individually comprise small elongated panels, are swingably connected to the side portions 17b and 17c of the hood periphery 17 by means of hinges 19. The various hinges 19 are respectively connected with the skirt panels 18b and the hood 14 and the hinges 19 are disposed to swing about axes which are disposed diagonally with respect to each other. It should be noted that the adjacent ends of the individual skirt sections 18b overlap each other in the condition of the skirt shown in Fig. 1. This overlapping is necessary in order to restrict the amount of straw fragments which will be discharged and scattered between the skirt panels 18b. If the skirt panels 18b are swung outwardly or upwardly, the panel end portions will swing slightly apart. If the skirt panels 18b are swung to positions more nearly approximating the normal with respect to panel 14, the end portions thereof will overlap slightly more.

Adjustable means are provided for controllably varying the position or slope of each of the skirt panels 18b. And in the form shown, as best seen in Fig. 3, such means include a pair of apertured brackets 22a which are respectively fixed, as by welding, to the hood 14 and to the skirt panel 18b. Such means also include a bolt 22b which extends through the apertures in brackets 22a and has a nut 22c thereon. A spring 22d is interposed between the brackets 22a and is carried on bolt 22b for urging the brackets 22a apart as bolt 22b and nut 22c draw the brackets together, thereby cooperating to securely hold the panel sections 18b of skirt 18 in fixed position.

Means are provided for controllably shifting the outer portion 17 of panel 14 in a vertical direction. Such means include an adjustable interconnection 20 which consists in a rod 20a disposed between the mounting structure and the outer edge portion 17 of panel 14, apertured brackets 21 which are respectively secured to the panel 14 and to channel 13a and also adjustably secured to the opposite threaded ends of rod 20a by nuts 20b.

A pair of substantially vertical rotary shafts 23 and 24 are journalled as by bearings 25 in the gear boxes 13 and in widely spaced relation with each other adjacent the inner edge 16 of panel 15 and adjacent the opening 12 of housing 10. Shafts 23 and 24 extend through suitable openings in the hood 14 and have a plurality of radial cutting or chopping arms or blades 26 and 27 secured thereto respectively. All of the arms 26 and 27 lie in a substantially common plane and are disposed in spaced relation below the lower surface 14a of hood 14. Arms 26 and 27 have sharpened leading edges 26a and 27a respectively. Arms 26 and 27 are of sufficient length to swing under a substantial portion of the opening 12 in housing 10 and to swing into proximity with the opposite shaft to thereby define orbital paths of travel which overlap each other in the area between the shafts 23 and 24. Arms 26 and 27 will revolve with their respective shafts in the direction of arrows A so as to move, when passing through the overlapping portions of the orbital paths of travel, in a generally outward direction from opening 12 of housing 10 toward the outer portion 17 of hood 14.

Means are provided for interconnecting shafts 23 and 24 for synchronizing rotation thereof and for connecting the same to a high speed source of rotary power. In the form shown, such means include bevel gears 28 and 29 which are affixed to shafts 23 and 24 respectively, and bevel gears 30 and 31 which are affixed to rotary shaft 32 and which are respectively meshed with the corresponding rotary gears 28 and 29. Shaft 32 is suitably journalled in bearings provided in gear boxes 13b and 13c and is connected to a high speed source of rotary power (not shown) on the combine by means of a pulley 33 and belt 34. Gear boxes 13b and 13c will be filled with oil for lubrication of gears 28—30.

It will be noted that means are provided adjacent the lower edge of the combine housing 10 and above the rotating blades 26 and 27 for deflecting the straw passing rearwardly and down through housing 10 and for directing this straw slightly forwardly again in the manner indicated by arrows S. In the form shown, such means comprise a deflector or guide plate or apron 38 as best seen in Fig. 2. Plate 38 extends across the entire width of housing 10 and is suitably affixed as by bolts to the lower edge of channel 13a. Deflector apron 38 extends forwardly and downwardly around gear boxes 13b and 13c and into proximity with the plane of hood 14.

Shearing edge means are provided for intimate cooperation with the rotating arms 26 and 27 for fragmentizing stalks and straw discharged from the housing 10. In the form shown, such means comprise an angle plate 39 which extends substantially completely across the inner edge portion 16 of hood 14 and is disposed in close proximity therewith and below the opening 12 of hood 10 through which stalks and straw are discharged. Plate 39 is constructed of a somewhat heavier gauge sheet metal than is deflector plate 38, and is supported by gear boxes 13b and 13c to which it is affixedly connected as by bolts. Plate 39 is also fixedly secured to the lower edge portion of straw deflecting apron 38, and to the inner edge portion 16 of hood 14, as by rivets. The lower edge portion 39a of plate 39 defines a shear edge and depends below the plane of hood 14 into immediate proximity with the rotating arms 26 and 27 for cooperative shearing action therewith.

An elongated and narrow retaining wall 35 is affixed to the lower surface of the outer panel 17 of hood 14 and is comprised of a pair of arcuate wall segments 36 and 37 which respectively extend around portions of the periphery of the orbital paths of travel of the arms 26 and 27 of rotary shafts 23 and 24. Wall segments 36 and 37 meet each other in a generally end to end relation and are joined together at that portion of the orbital paths of travel of the arms where the orbital paths overlap each other. The retaining wall 35 may be described as being shaped similar to a vertically disposed double trough wherein the separate trough portions partially encircle the separate orbital paths of travel of the arms 26 and 27. Retaining wall 35 terminates, in the form shown, adjacent the side portions 17b and 17c of the hood periphery 17. It will be noted that the lower edge of the wall 35 is disposed substantially in the plane in which rotating arms 26 and 27 lie.

Means are provided for supplementing the shearing effect between blades 26 and 27 and shear edge 39a for adapting the mechanism for use with a wide variety of stalks and straw wherein additional cutting must be effected in order to properly fragmentize the straw. In the form shown, such means comprise a plurality of shear bars 40, which in the form shown, are constructed of angle iron and are removably secured in depending position on the surface 14a of hood 14 so as to extend downwardly therefrom into close proximity with the rotating arms 26 and 27. It will be noted that shear bars 40 are disposed, generally, between the inner edge portion 16 of hood 14 and the arcuate retaining wall 35, and are secured to hood 14 by means of bolts 41 having wing nuts 42 thereon in order to facilitate ready removal of the individual shear bars 40 from the hood 14. The shear bars 40 are disposed diagonally with respect to the shear 39a and are disposed diagonally with respect to each other, and extend generally radially outwardly from the respective shafts 23 and 24. The outer end portions of shear bars 40 are disposed in close proximity with the arcuate retaining wall 35 so as to restrict the amount of straw which may pass therebetween.

It may be necessary in some harvesters, depending upon the location of the end of the straw walker or conveyor C with respect to the housing 10, to provide a straw guiding plate 43 which extends transversely across the housing 10 between the sidewalls thereof and is disposed below the end of the straw walker C and in an inclined position so as to direct the straw falling from the walker C rearwardly toward the fragmentizing mechanism. The straw-guiding plate 43 may be removably mounted as by bolts 44 which extend through the mounting ears 43a so as to adapt the mechanism for permitting the straw to be discharged downwardly into swaths if this operation is desired.

*Operation*

Before the actual combining or harvesting is commenced, certain adjustments to the mechanism will be made. Depending upon the nature of the crop to be harvested, certain of the shear bars 40 may be removed. If the crop to be harvested is oats or wheat or some similar crop having the type of straw found in these crops, certain of the shear bars 40 may be removed and should be removed in order to properly fragmentize the straw. In the case of oats, it is desirable that all of the shear bars 40 be removed. However, if the crop to be harvested is of the nature of soy beans or millet, the straw or stalks are more difficult to fragmentize and therefore additional cutting must be effected over and above that produced by the arms 26 and 27 swinging into close proximity with shear adge 39a. Therefore, certain of the shear bars 40 will be secured to the hood 14 for cooperative cutting action with the rotating arms 26 and 27. It may be desirable to use all of the shear bars 40 shown in Fig. 1.

Furthermore, depending upon at least the manner in which the field is to be harvested, the straw fragment scattering control mechanism which consists primarily in skirt 18, must be adjusted. It is desirable that straw fragments be scattered further from the mechanism toward the outer edge of the field which has already been cut than toward the inner portion of the field wherein the crop remains standing or unharvested. If the harvester is to be moved around the field in a counter-clockwise direction, the outer edge of the field will be to the right of the combine and the inner portion of the field will be to the left of the combine. The adjustable straw deflecting panels 18b of skirt 18 will be swung upwardly and outwardly on the right hand side of the combine or, as shown in Fig. 1, those panels 18b which are secured to the side portion 17c of the hood outer periphery 17. The adjustable panels 18b on the left side of the combine will be adjusted to a position wherein they extend more nearly normal to hood 14 than do the previously mentioned panels 18b on the right hand side of the combine.

After these preliminary adjustments have been made, the combine may be started and the belt 34 will be rapidly moved to rotate pulley 33, shaft 32 and the vertically disposed shafts 23 and 24 and the cutter arms 26 and 27. The arms will be revolved in the direction of arrow A and it has been found that a speed of approximately 1000 revolutions per minute is satisfactory. It should be noted that this speed is not critical but is cited to be exemplary of the range in which the blades must rotate. It has been found that the device also operates satisfactorily where the rotating arms move at speeds from 900 to 1200 revolutions per minute. When the cutter arms 26 and 27 have attained their desired speed, stalks and straw may be supplied by the walker C into the discharge passage 11 of housing 10, whereupon the straw will fall downwardly through the bottom opening 12 in housing 10 in the direction of arrow S. The falling straw will be slightly deflected by plate 38 in a forward direction so as to fall into engagement with the outer end portions of arms 26 and 27 rotating beneath the discharge opening 12. The blades 26 and 27 are traveling at an extremely high velocity and the leading sharpened edges thereof will immediately sever a portion of the straw and will carry the remainder of the fallen thereon into engagement with the shear plate 39. It will be noted that the orbital paths of travel of arms 26 and 27 overlap and that the arms will sweep the straw into this overlapped portion of the orbital paths as the straw is carried into engagement with shear plate 39. The shear edge 39a and the leading sharpened edges 26a and 27a cooperate to sever the straw and stalks into small fragments and to thereafter carry these fragments or propel the same toward the deflecting skirt 18.

Some quantities of uncut straw, or straw that could be cut into smaller fragments will be carried by arms 26 and 27 beyond the shear edge 39a and this straw will be retained above arms 26 and 27 by the retaining wall 35 for further cutting. Whether or not the shear bars 40 are attached to the hood 14 and in operative position, there will be additional cutting of the sraw retained by the wall 35, but of course therewill be substantially increased cutting of the straw and stalks when the shear bars 40 are in place. This is highly desirable in the fragmentizing of the straw from soy beans and millet and other similar straws which are difficult to cut. The straw retained by the wall 35 and between the wall and hood 14 will be subjected to cutting a multiplicity of times when a plurality of shear bars 40 are in place.

It should be mentioned here that the present invention does not disintegrate the straw to the degree that the sraw is comminuted or pulverized, but on the other hand the straw is cut into small fragments or pieces. It is believed that to comminute or pulverize the straw is unnecessary and undesirable to obtain the desired soil conditioning and fertilizing and furthermore, to unnecessarily disintegrate the straw into a pulverant causes a substantial waste of power. Therefore, in this sense the present machine very substantially saves valuable power and therefore does not unduly burden the source of power of the combine.

When the rapidly revolving arms 26 and 27 engage the stalks and straw and cut the same, a very substantial centrifugal force is imparted to the straw particles and causes these particles to be flung outwardly from the blades in multi-directions and into engagement with the straw-deflecting skirt 18. As the straw fragments engage the skirt panels 18b on the left side of the machine adjacent the side portion 17b of the hood periphery they will be deflected sharply downwardly because of the steep slope of these panels as previously adjusted. Therefore on the left side of the combine the straw fragments will engage the ground close to the combine and will not be spread any substantial extent into the uncut portions of the field. On the other hand, the straw fragments which strike the skirt panels 18b on the right hand side of the machine, or those panels adjacent the side portion 17c of the hood periphery 17, will be deflected downwardly to a lesser extent than those fragments discharged from the left hand side of the combine as previously described. Therefore the straw fragments impelled outwardly from the right hand side of the combine will be spread outwardly from the combine a distance substantially further than were the sraw fragments spread from the other side of the combine. It should be noted that a portion of the straw fragments will be propelled directly rearwardly from the combine and engage the stationary portion 18a of skirt 18 and be deflected downwardly toward the ground thereby. The straw fragments will, as a result of the operation, be distributed evenly over an area of substantial width, at least equal to the width of the cut being made by the harvester. Substantially all of the straw fragments and particles impelled by the arms 26 and 27 outwardly will engage the outwardly and downwardly inclined straw deflecting skirt 18 and will thereby be directed toward the ground. As a result, the dust created by cutting the straw and impelling it outwardly is very substantially reduced and substantially no particles or straw fragments will be impelled upwardly as they move outwardly from the confines of hood 14 and skirt 18. Working conditions adjacent the combine are thereby improved to a considerable extent by the substantial elimination of dust.

It should be mentioned here that the straw particles may be distributed outwardly from the harvester in different patterns by adjustment of the skirt panels 18b. It is possible by adjusting these panels 18b to spread the straw fragments a substantial distance both ways laterally outwardly from the harvester and it is possible by adjustment of panels 18b to confine the spreading to a narrower area. It should also be mentioned that the present invention is not to be limited to the provision of swingably adjustable panels 18b in order to adjust the slope of the straw-deflecting skirt 18, but on the other hand, the panels 18b consist in only one embodiment of the present invention.

The vertical position of the rear portion 17a of the hood outer periphery 17 may be adjusted by screwing nuts 20b in one direction or the other along rod 20a. If the rear portion 17a of the hood periphery is raised, the retaining wall 35 will similarly be raised therewith and the degree of straw cutting will be decreased. As a result larger fragments will be discharged from the mechanism and spread onto the ground. To some extent, the distribution of the straw is affected by the raising and lowering of the rear portion 17a of the hood periphery and when this portion is raised, a somewhat greater proportion of the straw particles will be discharged rearwardly from the mechanism.

Another highly advantageous feature of this mechanism is that it will not be stopped up with straw when the combine is stopped for any reason when threshing. The straw need not be removed from the straw conveyor C in order to allow the fragmentizing mechanism to come up to proper operating speed at a later time, because as straw is discharged onto the blades 26 and 27 they will at least scatter the straw while attaining operating speeds if the blades do not have sufficient velocity to properly cut the straw.

It will be noted that I have provided a new and improved mechanism for use with harvesting equipment such as combines and the like, which is of relatively simple and inexpensive construction and operation and which thoroughly fragmentizes straw to the proper degree for proper soil conditioning and fertilizing and thereafter spreads the straw fragments in a desired and adjustable pattern behind the combine so as to substantially completely cover the ground with these particles without creating more than a very minimum of dust as the straw fragments are spread.

It will, of course, be understood that various changes may be made in the form, detail, arrangement and proportion of the parts without departing from the scope of my invention which consists of the matter described herein and set forth in the appended claims.

What is claimed is:

1. A stalk and straw disintegrating and scattering device for a harvester such as a combine of the general type having a descending stalk and straw discharge passage defined by a multi-wall housing with a generally rectangular opening at the terminal portion thereof, said device comprising a mounting structure adapted for attachment to such a housing adjacent the terminal portion thereof, a pair of substantially vertical shafts journalled in said mounting structure adjacent the opening in said housing and in widely spaced relation with each other, a plurality of arms fixed to each of said shafts and extending generally radially therefrom in a substantially common plane to swing under the discharge passage opening, said arms swinging in orbital paths which have common portions, means carried by said structure and constructed and arranged to define an elongated shear edge disposed above and in close proximity with said arms, and a driving interconnection interposed between said shafts for moving the same in counter-rotation and in an outward direction away from said opening and below said shear edge in the common portions of their orbital paths, and said driving interconnection being adapted for connection to a high speed source of rotary power for rotating said arms at a high speed, whereby stalks and straw discharged through the opening of the housing will be cut into small particles and moved generally outwardly away from the opening by said rotating arms.

2. A stalk and straw disintegrating and scattering device for a harvester such as a combine of the general type having a descending stalk and straw discharge passage defined by a multi-wall housing with a generally rectangular opening at the terminal portion thereof, said device comprising a mounting structure adapted for attachment to such a housing adjacent the terminal portion thereof, a hood secured to said mounting structure and having an enlarged and generally horizontal and downwardly facing surface, said surface having an inner edge portion disposed adjacent the opening in such a housing and also having an outer portion disposed outwardly of the housing from said opening, a pair of substantially vertical rotary shafts journalled in said mounting structure adjacent the inner edge of said surface and in widely spaced relation with each other, a plurality of arms fixed to each of said shafts in close proximity with and below said surface, said arms extending generally radially outwardly from the respective shafts to swing under the opening in the housing and into proximity with the opposite shaft, said arms of said separate shafts defining, when rotated, orbital paths of rotation which overlap each other, said arms moving generally outwardly from the opening in the housing when traveling through the overlapping portions of their orbital paths, means carried by said structure and constructed and arranged to define a shear edge disposed above and in close proximity with said arms, and means interconnecting said shafts for driving at high speeds from a source of rotary power, whereby stalks and straw discharged from the opening in the housing will be cut and thereafter discharged in multi-directions rearwardly from the housing and also laterally therefrom when said arms are revolved at high speed.

3. A stalk and straw disintegrating and scattering device for a harvester such as a combine of the general type having a descending stalk and straw discharge passage defined by a multi-wall housing with a generally rectangular opening at the terminal portion thereof, said device comprising a mounting structure adapted for attachment to such a housing adjacent the terminal portion thereof, a hood secured to said mounting structure and including an enlarged and generally horizontal surface having an inner edge disposed adjacent the opening in such a housing and also an outer portion disposed outwardly of the housing from said opening, a pair of substantially vertical rotary shafts journalled in said mounting structure adjacent the inner edge of said surface and in spaced relation with each other, a plurality of cutter arms fixed to each of said shafts below and in close proximity with said shear edge and said surface, each of said arms having a sharpened edge and each extending generally radially outwardly from its respective shaft to swing in an orbital path under the opening in the housing, the orbital paths of said arms of said separate shafts being in a substantially common plane and having common portions between said shafts, means carried by said structure and constructed and arranged to define a shear edge disposed above and in close proximity with said arms, means interconnecting the shafts for driving at high speeds from a source of rotary power, said arms moving in the overlapped portion of said orbital paths in a generally outwardly direction from said opening when rotated, and a wall segment depending from said outer portion of said surface and having portions thereof in arcuate proximity with the orbital paths of at least some of said arms, whereby when said arms are rotated at high speed, straw and stalks discharged through said opening will be cut by said arms and will be retained by and between said hood, wall segment and arms until the straw material is thoroughly disintegrated and will then be discharged onto the ground surface.

4. A stalk and straw disintegrating and scattering device for a harvester such as a combine of the general type having a descending stalk and straw discharge passage defined by a multi-wall housing with a generally rectangular opening at the terminal portion thereof, said device comprising a mounting structure adapted for attachment to such a housing adjacent the terminal portion thereof, a hood secured to said mounting and including an enlarged and generally horizontal surface facing downwardly, said surface having an inner edge disposed adjacent the opening in such a housing and also having an outer portion disposed outwardly of the housing from said opening, a pair of elongated and arcuate wall segments extending substantially horizontally and being generally disposed in an end to end relation with each other, said arcuate wall segments depending from said outer portion of said surface and having their concave sides generally facing toward the opening in the housing, a pair of substantially vertical rotary shafts journalled in said mounting structure adjacent the inner edge of said surface and in spaced relation with each other, said shafts being respectively disposed between said wall segments and the opening in such a housing, a plurality of cutter arms having sharpened edges and being fixed to each of said shafts below said surface and in close proximity therewith, said arms having tips swinging in an orbital path into close proximity with said arcuate wall segments, said orbital paths having common portions, means connecting said shafts for driving at high speeds from a source of rotary power, and means carried by said structure and defining a shear edge above and in close proximity with said arms, whereby when said arms are rotated at high speed, straw and stalks discharged through said opening will be cut by said arms and will be retained by said hood and wall segments until the straw material is fragmentized and will thereafter be discharged onto the ground surface.

5. The structure recited in claim 4 wherein said outer portion of said hood and said wall segments are shiftable in a vertical direction to vary the cutting of the stalks and straw discharged from the combine housing and to vary the distribution of the stalk and straw particles onto the ground, and means for adjustably positioning said outer portion of said hood and said wall segments.

6. A stalk and straw disintegrating device for a harvester such as a combine of the general type having a housing with a multi-wall terminal portion defining a stalk and straw discharge passage with a generally rectangular discharge opening, said device comprising a mounting structure, a hood secured to said mounting structure and including a generally horizontal surface having an inner edge disposed adjacent the opening in such a housing and also having an outer portion disposed outwardly of the housing from said opening, a substantially vertical rotary shaft journalled in said mounting structure adjacent the inner edge of said surface, a plurality of arms fixed to said shaft in substantially horizontal position and being disposed in close proximity with and below said surface, said arms swinging with rotation of said shaft under the opening in the housing and under said surface, means carried by said mounting structure and defining a depending shear edge disposed above and in close proximity with said arms, an elongated retaining wall depending from said surface at the outer portion thereof, said wall extending arcuately around a portion of the orbital path defined by said arms when rotated, and means connecting said shaft for driving at high speeds from a source of rotary power, whereby stalks and straw discharged from the opening in the housing and carried by said arms into proximity with said surface and said retaining wall, will be retained by said surface and wall until disintegrated by said arms when the same are rotated at high speed.

7. A stalk and straw disintegrating and scattering device for a harvester such as a combine of the general type having a descending stalk and straw discharge passage defined by a multi-wall housing with a generally rectangular opening at the terminal portion thereof, said device comprising a mounting structure adapted for attachment to such a housing adjacent the terminal portion thereof, a hood secured to said mounting structure and including an enlarged and generally horizontal and downwardly facing surface having an inner edge portion disposed adjacent the opening in such a housing and also having an outer portion disposed outwardly of the housing from the opening, a straw deflector skirt secured to the outer portion of said hood and sloping downwardly and outwardly therefrom, a pair of substantially vertical rotary shafts journalled in said mounting structure adjacent the inner edge portion of said surface and in widely spaced relation with each other, a plurality of arms fixed to each of said shafts below said surface, said arms extending generally radially outwardly from the respective shafts to swing under the opening in the housing and into proximity with the opposite shaft, said arms of said separate shafts defining, when rotated, orbital paths of rotation which overlap each other, and said arms moving generally outwardly from the opening in the housing when traveling through the overlapped portions of their orbital paths, depending means defining a shear edge disposed below said surface and in close proximity with said arms, and means interconnecting said shafts for driving at high speeds from a source of rotary power, whereby stalks and straw discharged from the opening in the housing will be fragmentized and thereafter discharged in multi-directions toward said sloping straw deflector for discharge rearwardly and laterally from the combine and toward the ground.

8. A stalk and straw disintegrating and scattering device for a harvester such as a combine of the general type having a descending stalk and straw discharge passage defined by a multi-wall housing with a generally rectangular opening at the terminal portion thereof, said device comprising a mounting structure adapted for attachment to such a housing adjacent the terminal portion thereof, a hood secured to said mounting structure and including an enlarged and generally horizontal surface having an inner edge disposed adjacent the opening in such a housing and also an outer portion disposed outwardly of the housing from said opening, a pair of substantially vertical rotary shafts journalled in said mounting structure adjacent the inner edge of said surface and in spaced relation with each other, a plurality of cutter arms fixed to each of said shafts below said surface, each of said arms having a sharpened edge and each extending generally radially outwardly from its respective shaft to swing in an orbital path under the opening in the housing, the orbital paths of said arms of said separate shafts being in a substantially common plane and having common portions between said shafts, means interconnecting the same for driving at high speeds from a source of rotary power, said arms moving in the overlapped portion of said orbital paths in a generally outwardly direction from said opening when rotated, means defining a shear edge carried by said structure and disposed above and in close proximity with said arms, a wall segment depending from said outer portion of said surface and having portions thereof in arcuate proximity with the orbital paths of at least some of said arms, and a downwardly and outwardly sloping straw deflector skirt mounted on the outer portion of said surface and being disposed outwardly from said wall segment, said deflector skirt extending downwardly below said wall segment, whereby when said arms are rotated at high speed, stalks and straw discharged through said opening will be retained by said hood, wall segment and arms until fragmentized by said arms and will thereafter be impelled outwardly into engagement with said straw deflector to be directed thereby toward the ground surface.

9. A stalk and straw fragmentizing and scattering device for a harvester such as a combine of the general type having a descending stalk and straw discharge passage with a generally rectangular opening at the terminal portion thereof, said device comprising a mounting structure adapted for attachment to such a housing adjacent the terminal portion thereof, a hood secured to said mounting structure and having an enlarged and generally horizontal and downwardly facing surface, said surface having an inner edge portion disposed adjacent the opening in such a housing and having an outer portion disposed outwardly of the housing from said opening, a pair of substantially rotary vertical shafts journalled in said mounting structure adjacent the inner edge portion of said surface and in widely spaced relation with each other, a plurality of arms fixed to each of said shafts below said surface, said arms extending generally radially outwardly of the respective shafts to swing under the opening in the housing and said hood and into proximity with the opposite shaft, said arms of said separate shafts defining when rotated, orbital paths of rotation which overlap each other, means carried by said support structure and defining an elongated shear edge extending between said shafts and disposed above said arms and in close proximity therewith, a plurality of shear bars removably mounted on said hood above and in close proximity with said arms, said shear bears extending diagonally with respect to said shear edge, a retaining wall segment depending from said outer portion of said surface and having portions thereof in arcute proximity with the orbital paths of at least some of said arms, whereby to adapt the fragmentizing and scattering device for use with a wide variety of types of straw and stalks in the fragmentizing and scattering thereof.

10. A stalk and straw fragmentizing and scattering device for a harvester such as a combine of the general type having a descending stalk and straw discharge passage defined by a multi-wall housing with a generally rectangular opening at the terminal portion thereof, said device comprising a mounting structure adapted for attachment to said housing adjacent the terminal portion thereof, a hood secured to said mounting structure and having an enlarged and generally horizontal downwardly facing surface, said surface having an inner edge portion disposed adjacent the opening in such a housing and also having an outer portion disposed outwardly of the housing from said opening, a pair of substantially rotary shafts journalled in said mounting structure adjacent the inner edge of said surface and in widely spaced relation with each other, a plurality of arms fixed to each of said shafts below said surface, said arms extending generally radially outwardly from the respective shafts to swing under the opening in the housing and into proximity with the opposite shaft, said arms of said separate shafts defining when rotated, orbital paths of rotation which overlap each other, a plurality of shear bars secured on said hood and depending from said surface into close proximity with said arms, said shear bars being diagonally disposed with respect to each other for cooperation with said arms in fragmentizing stalks and straw, a pair of elongated and arcuate retaining wall segments extending substantially horizontally and being generally disposed in end to end relation with each other, said arcuate wall segments depending from the outer portion of said surface and having their concave sides generally facing the opening in the housing and disposed in close proximity with the orbital paths defined by said arms when rotated, and means interconnecting said shafts for driving at high speeds from a source of rotary power, whereby to retain stalks and straw between said arms and said surface until fragmentized and then scatter the straw fragments in multidirections.

References Cited in the file of this patent

UNITED STATES PATENTS

| | | |
|---|---|---|
| 1,345,427 | Williams | July 6, 1920 |
| 1,769,302 | MacGregor | July 1, 1930 |
| 2,280,677 | Wagner et al. | Apr. 21, 1942 |
| 2,500,682 | Hoffstetter | Mar. 14, 1950 |
| 2,712,944 | Stevens | July 12, 1955 |
| 2,719,556 | Summerville et al. | Oct. 4, 1955 |